United States Patent
Baker (10) Patent No.: US 8,601,359 B1
(45) Date of Patent: Dec. 3, 2013

(54) PREVENTING AUTOCORRECT FROM MODIFYING URLS

(71) Applicant: Erica Baker, Mountain View, CA (US)

(72) Inventor: Erica Baker, Mountain View, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/671,225

(22) Filed: Nov. 7, 2012

Related U.S. Application Data (60) Provisional application No. 61/704,348, filed on Sep. 21, 2012.

(51) Int. Cl.
*G06F 17/24* (2006.01)

(52) U.S. Cl.
USPC .......................................................... 715/208

(58) Field of Classification Search
USPC .......................................................... 715/208
See application file for complete search history.

(56) References Cited

U.S. PATENT DOCUMENTS

| | | | |
|---|---|---|---|
| 5,907,680 A | 5/1999 | Nielsen | |
| 6,009,459 A * | 12/1999 | Belfiore et al. | 709/203 |
| 6,092,100 A | 7/2000 | Berstis et al. | |
| 6,094,665 A * | 7/2000 | Lyons et al. | 715/234 |
| 6,678,681 B1 * | 1/2004 | Brin | 707/754 |
| 7,296,019 B1 * | 11/2007 | Chandrasekar et al. | 1/1 |
| 7,376,752 B1 * | 5/2008 | Chudnovsky et al. | 709/245 |
| 7,499,940 B1 * | 3/2009 | Gibbs | 1/1 |
| 7,596,609 B1 | 9/2009 | Refuah et al. | |
| 7,769,820 B1 * | 8/2010 | Spies et al. | 709/218 |
| 7,853,719 B1 * | 12/2010 | Cao et al. | 709/245 |
| 7,966,310 B2 | 6/2011 | Sullivan et al. | |
| 2003/0014450 A1 * | 1/2003 | Hoffman | 707/533 |
| 2003/0216913 A1 * | 11/2003 | Keely et al. | 704/235 |
| 2005/0235031 A1 * | 10/2005 | Schneider et al. | 709/203 |
| 2006/0031205 A1 * | 2/2006 | Perkins et al. | 707/3 |
| 2006/0112066 A1 * | 5/2006 | Hamzy | 707/1 |
| 2006/0112094 A1 * | 5/2006 | Sullivan et al. | 707/5 |
| 2008/0033945 A1 | 2/2008 | Jassy et al. | |
| 2008/0126314 A1 * | 5/2008 | Thorn | 707/3 |
| 2009/0132529 A1 * | 5/2009 | Gibbs | 707/5 |
| 2009/0254501 A1 * | 10/2009 | Song et al. | 706/12 |
| 2012/0036468 A1 * | 2/2012 | Colley | 715/773 |
| 2012/0072281 A1 * | 3/2012 | Chang et al. | 705/14.49 |
| 2012/0239667 A1 * | 9/2012 | Vysyaraju et al. | 707/749 |

OTHER PUBLICATIONS

"URL Checker 1.0", Windows Phone / Microsoft 2012 [online]. Retrieved from the Internet: <http://www.windowsphone.com/en-US/apps/83eb4efe-64a8-e011-a53c-78e7d1fa76f8> 2 pgs.

* cited by examiner

*Primary Examiner* — Frank D Mills (74) *Attorney, Agent, or Firm* — Shumaker & Sieffert, P.A.

(57) ABSTRACT

A computing device receives key inputs indicating a string of text from a user. The string of text may be auto-corrected by inserting one or more space characters. In response to receiving subsequent key inputs indicating a period character followed by a domain suffix, the computing device may remove the inserted one or more space characters from the string of text to form a valid uniform resource locator. The computing device may output the valid uniform resource locator for display at a display device operatively coupled to the computing device.

17 Claims, 4 Drawing Sheets

PREVENTING AUTOCORRECT FROM MODIFYING URLS

CROSS-REFERENCE TO RELATED APPLICATION

This application claims priority to provisional application Ser. No. 61/704,348, filed on Sep. 21, 2012, entitled PREVENTING AUTOCORRECT FROM MODIFYING URLs, the entire content of which is incorporated by reference herein.

BACKGROUND

A user may interact with applications that are executing on a computing device (e.g., a mobile phone, tablet computer, smart phone, desktop computer, or the like). In some examples, a user may interact with an application executing on a computing device by inputting text. In some examples, a computing device may include an auto-correct functionality that corrects errors in text inputted by the user.

SUMMARY

In one example, a method includes receiving, by a computing device, key inputs indicating a string of text. The method further includes auto-correcting, by the computing device, the string of text, wherein auto-correcting comprises inserting one or more space characters into the string of text. The method further includes, in response to receiving subsequent key inputs indicating a period character followed by a domain suffix, removing, by the computing device, the inserted one or more space characters from the string of text, thereby forming a valid uniform resource locator. The method further includes outputting, by the computing device, the valid uniform resource locator for display at a display device operatively coupled to the computing device.

In another example, a computing device includes at least one processor. The at least one processor is configured to receive key inputs indicating a string of text. The at least one processor is further configured to auto-correct the string of text, wherein auto-correcting comprises inserting one or more space characters into the string of text. The at least one processor is further configured to, in response to receiving subsequent key inputs indicating a period character followed by a domain suffix, remove the inserted one or more space characters from the string of text, thereby forming a valid uniform resource locator. The at least one processor is further configured to output the valid uniform resource locator.

In another example, a computer-readable storage medium is encoded with instructions that, when executed, cause one or more processors of a computing device to perform operations. The operations include receiving key inputs indicating a string of text. The operations further include auto-correcting the string of text, wherein auto-correcting comprises inserting one or more space characters into the string of text. The operations further include, in response to receiving subsequent key inputs indicating a period character followed by a domain suffix, removing the inserted one or more space characters from the string of text, thereby forming a valid uniform resource locator. The operations further include displaying, at a display device operatively coupled to the mobile computing device, the valid uniform resource locator.

The details of one or more examples of the disclosure are set forth in the accompanying drawings and the description below. Other features, objects, and advantages will be apparent from the description and drawings, and from the claims.

DETAILED DESCRIPTION

In general, this disclosure is directed to techniques for improving user interactions with a computing device. Such techniques may improve a user's ability to input text, particularly uniform resource locators (URLs), into a computing device. A computing device may enable a user to input text by detecting user inputs from one or more input devices (e.g., a presence-sensitive display outputting a graphical keyboard and/or a physical keyboard). In some examples, a computing device may include an automatic correction (i.e., "auto-correct") module operable to automatically correct spelling and other errors included in the inputted text. For example, an automatic correction module may determine that a space character was omitted from the inputted text and, in some examples, the automatic correction module may insert one or more space characters into the inputted text. While typically accurate and helpful to the user, such automatic correction may introduce undesirable modifications into the inputted text. For example, a user may intentionally omit one or more space characters, such as when inputting a uniform resource locator (URL) comprising two or more concatenated words. In such a case, the automatic correction module may insert a space character between two words, typically resulting in a URL composed of the last inputted word and the domain suffix. Then, assuming that the user becomes aware that a modification was made to the URL, the user must manually undo automatic corrections (i.e., manually find and delete the inserted space characters).

Techniques of the present disclosure may improve the ease with which a user can input URLs. Using techniques of the disclosure, a user may, instead of inputting a URL and manually undoing automatic corrections made to the inputted URL, input a string of text into a computing device. The computing device may then apply automatic corrections to the string of text until the computing device detects the input of a domain suffix. The computing device may then undo the applied automatic corrections to form a URL corresponding to the user's input.

Figure 1:
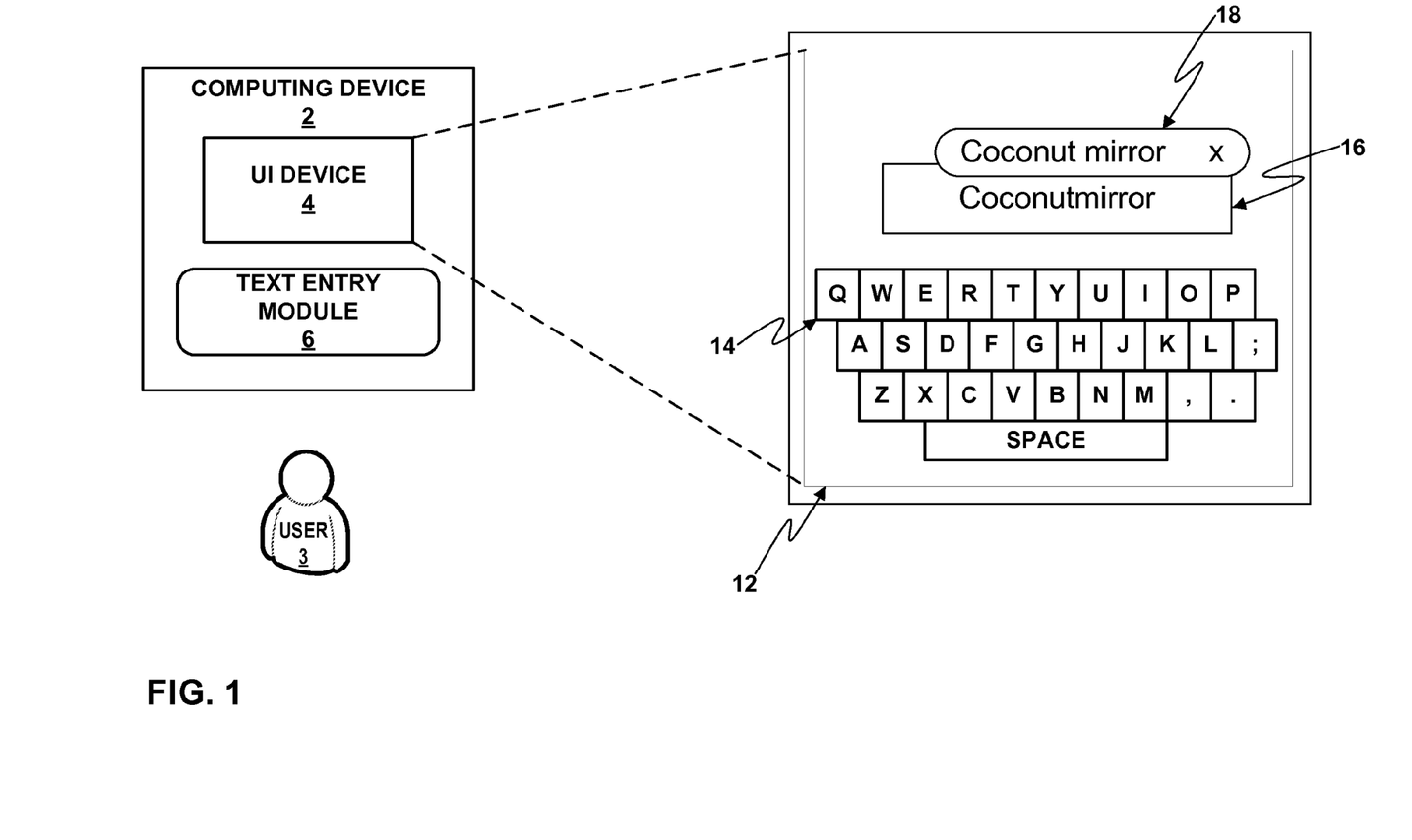
FIG. 1 is a block diagram illustrating an example computing device that may be used to undo auto-corrections made to uniform resource locators, in accordance with one or more techniques of the present disclosure.

FIG. 1 is a block diagram illustrating an example computing device 2 that may be used to undo auto-corrections made to uniform resource locators, in accordance with one or more techniques of the present disclosure. In some examples, computing device 2 may be associated with user 3. A user associated with a computing device may interact with the computing device by providing various user inputs to the computing device.

Examples of computing device 2 may include, but are not limited to, portable or mobile devices such as mobile phones (including smartphones), laptop computers, desktop computers, tablet computers, smart television platforms, gaming consoles, media players, wearable computing devices such as those with glasses or wristwatch form factors, personal digital assistants (PDAs), servers, mainframes, etc. As shown in the example of FIG. 1, computing device 2 may be a tablet computer. Computing device 2, in some examples, can include user interface (UI) device 4 and text entry module 6. Other examples of a computing device 2 that implement techniques of the disclosure may include additional components not shown in FIG. 1.

Computing device 2 may include UI device 4. In some examples, UI device 4 is configured to receive tactile, audio, or visual input. Examples of UI device 4, as shown in FIG. 1, may include a touch-sensitive and/or a presence-sensitive display or any other type of device for receiving input. UI device 4 may output content such as graphical user interface (GUI) 12 for display. In the example of FIG. 1, UI device 4 may be a presence-sensitive display that can display a graphical user interface and receive gesture inputs from a user using capacitive or inductive detection, or detect user gesture inputs via a video or acoustic sensor, for example, at or near the presence sensitive display. UI device 4 may be operatively coupled to computing device 2 and to one or more processors of computing device 2, such as by hard-wire signal-bearing connections and integration as part of computing device, or coupled by means of wireless signal connections from a separate or remote computing device or processors(s), etc. In one example, a video camera capable of transmitting user input information to computing device 2 may visually identify a gesture performed by user 3. Upon visually identifying the gesture of the user, a corresponding user input may be received by computing device 2 via the video camera. In another example, one or more acoustic sensors may identify mechanical vibrations or other acoustic signals that a user may make with gestures such as tapping or otherwise contacting or manipulating a surface or object, and computing device 2 may interpret the acoustic signals as user gesture inputs. The aforementioned examples of input devices are provided for illustration purposes. Other techniques may also be suitable to detect a user gesture and process properties of a user gesture as a gesture input. Each of the examples of input methods described herein may be used to receive key inputs that indicate one or more characters that may form a string of text.

As shown in FIG. 1, computing device 2 may include text entry module 6. Text entry module 6 may perform one or more functions to receive input, such as key inputs indicating a string of text, and send such input to other components associated with computing device 2. For instance, in the example of FIG. 1, text entry module 6 may cause UI device 4 to output GUI 12 which may include graphical keyboard 14. Text entry module 6 may also receive data from components associated with computing device 2. In the example of FIG. 1, text entry module 6 may receive user input via graphical keyboard 14 of GUI 12 displayed at UI device 4. In some examples, such as where UI device 4 includes a presence-sensitive display, text entry module 6 may receive user input at a virtual text entry field at the presence-sensitive display. Using the data, text entry module 6 may cause other components associated with computing device 2, such as UI device 4, to provide output based on the data. For instance, text entry module 6 may cause UI device 4 to display information in text entry field 16 of GUI 12. Text entry module 6 may be implemented in various ways. For example, text entry module 6 may be implemented as a downloadable or pre-installed application or "app." In another example, text entry module 6 may be implemented as part of a hardware unit of computing device 2. In another example, text entry module 6 may be implemented as part of an operating system of computing device 2.

Text entry module 6, in accordance with techniques of the present disclosure may perform one or more functions to process received user input, such as key inputs that indicate strings of text. In some examples, text entry module 6 may perform automatic correction to received user input, such as spelling corrections. For instance, to correct the omission of a space character, text entry module 6 may insert a space character into the user input. In some examples, text entry module 6 may cause UI device 4 to display a corrected version of the user input in suggestion window 18 of GUI 12.

Text entry module 6 may determine that automatic corrections were improperly made to the user input. For example, text entry module 6 may determine that corrections were improperly made to the user input where text entry module 6 inserted one or more space characters into a URL. In some examples, in response to determining that text entry module 6 inserted one or more space characters into a URL, text entry module 6 may remove the inserted one or more space characters from the string of text, thereby forming a valid uniform resource locator.

As shown in FIG. 1, GUI 12 may be a user interface generated by text entry module 6 that allows user 3 to interact with computing device 2. GUI 12 may include graphical content. Graphical content, generally, may be any visually displayable graphical object of a graphical user interface. Examples of graphical content may include text, images, a group of moving images, etc. Such examples may include a picture, animation, video, characters of a character set etc. As shown in FIG. 1, graphical content may include graphical keyboard 14, text entry field 16, and suggestion window 18.

Techniques of the present disclosure may improve the ease with which a user can input URLs. Using techniques of the disclosure, a user may, instead of inputting a URL and manually undoing automatic corrections made to the inputted URL, input a string of text into a computing device. The computing device may then apply automatic corrections to the string of text until the computing device detects the input of a domain suffix. The computing device may then undo the applied automatic corrections to form a URL corresponding to the user's input.

As shown in the example of FIG. 1, text entry module 6 may cause UI device 4 to display GUI 12 including graphical keyboard 14 and text entry field 16. User 3, in accordance with the techniques of the disclosure, may input a string of text into graphical keyboard 14. In one example, UI device 4 includes a presence-sensitive display and the user inputs are received at a text entry field 16 at the presence-sensitive display. In some examples, user 3 inputs the string of text by tapping on individual characters of graphical keyboard 14. In some cases, user 3 may input the string of text into a different input device such as a physical keyboard. In the example of FIG. 1, as user 3 inputs the string of text (i.e., "Coconutmirror") into graphical keyboard 14 displayed on UI device 4, text entry module 6 receives the string of text and causes UI device 4 to display the string of text at text entry field 16 of GUI 12.

Text entry module 6 then performs automatic correction functions on the string of text. In the example of FIG. 1, the string of text "Coconutmirror" includes what text entry module 6 detects as a spelling error in that the user omitted a space character between the word "Coconut" and the word "mirror". In response to detecting the error in the string of text, text entry module 6 may determine one or more suggestions to correct the error in the string of text. In some cases, text entry module 8 may present one or more of the suggestions to user 3 by causing UI device 4 to display suggestion window 18 containing the corrected the string of text. In the example of FIG. 1, text entry module 6 determines that the error in the string of text may be corrected by inserting a space character between the word "Coconut" and the word "mirror". Text entry module 6 then causes UI device 4 to display suggestion window 18 containing the corrected string of text "Coconut mirror". In some examples, text entry module 6 may modify the information displayed in text entry field 16 based on the corrected string of text presented in suggestion window 18.

Text entry module 6 may then receive subsequent user inputs in a manner similar to previously described. In response to receiving subsequent user inputs, text entry module 6 may determine that automatic corrections were improperly made to the user input where text entry module 6 inserted one or more space characters into a URL. In response to determining that text entry module 6 inserted one or more space characters into a URL, text entry module 6 may automatically remove the inserted one or more space characters from the string of text, thereby forming a valid URL. In the example of FIG. 1, if the subsequent input received from user 3 include a period character followed by a domain suffix (e.g., subsequent user inputs of ".com"), URL forming module 10 may remove the space character and form the URL "coconutmirror.com". In some examples, URL forming module 10 may cause UI device 4 to display the formed URL in text entry field 16. For example, computing device 2 or one or more processors thereof, executing URL forming module 10, may output the valid uniform resource locator for display at a display device such as UI device 4 that is operatively coupled to computing device 2.

A domain suffix may be a top-level domain (TLD) in the Domain Name System of the Internet (e.g., "com", "org", "edu", "net", "mil", or a country code TLD such as "us", "uk", "tv", "me", "es", "ly", "cx", "io", etc.). The domain suffix may also be or include characters in non-Latin alphabets or other writing systems, which may collectively be referred to as scripts, such as characters from the Greek, Arabic, Cyrillic, Hebrew, Japanese, Devanagari, Urdu, Korean, Malay, That, Tamil, Telugu and Chinese scripts. In some examples, the domain suffix may include one or more period characters, such as "co.uk".

In this way, techniques described in this disclosure may improve a user's ability to input text, particularly uniform resource locators (URLs), into a computing device.

Figure 2:
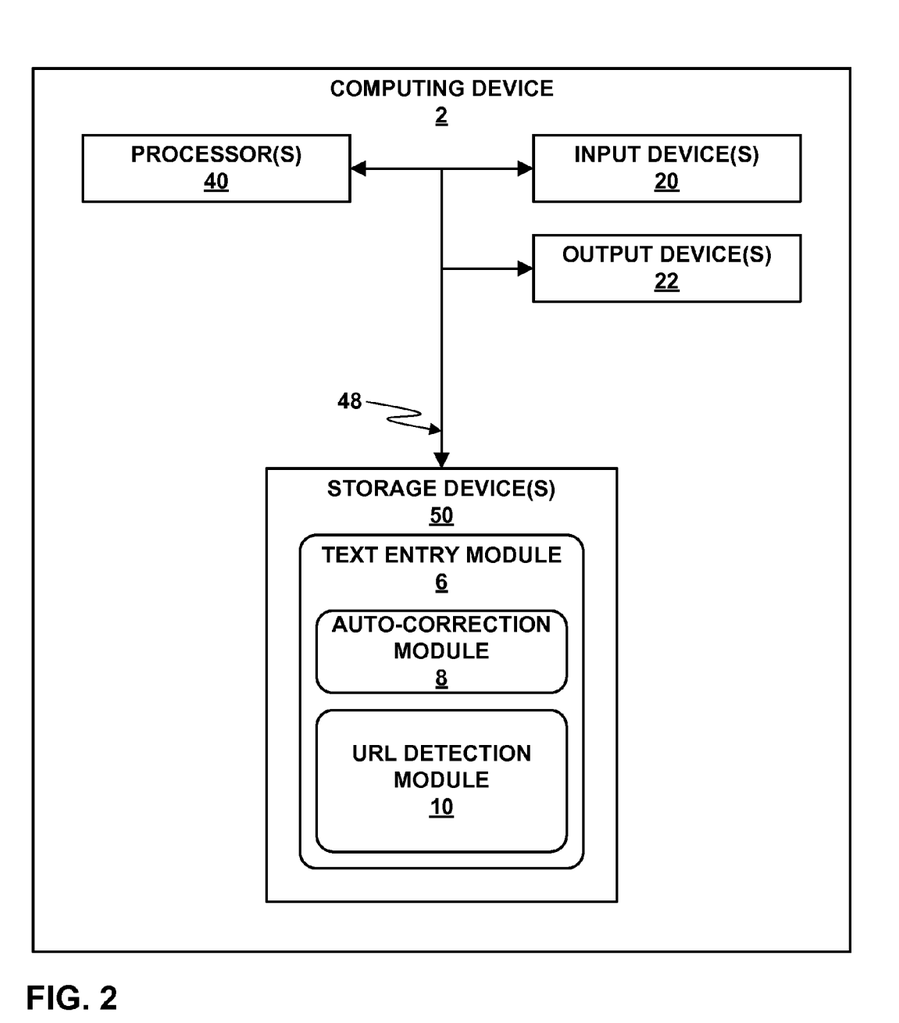
FIG. 2 is a block diagram illustrating further details of one example of a computing device shown in FIG. 1, in accordance with one or more aspects of the present disclosure.

FIG. 2 is a block diagram illustrating an example configuration of a computing device 2. FIG. 2 illustrates only one particular example of computing device 2, and many other example configurations of computing device 2 may be possible. As shown in the specific example of FIG. 2, computing device 2 includes one or more processors 40, one or more input devices 20, one or more output devices 22, and one or more storage devices 50. In this example, storage device 50 of computing device 2 also includes text entry module 6, auto-correction module 8, and URL detection module 10. Communication channels 48 may interconnect each of the components 6, 8, 10, 20, 22, 40, and 50 (physically, communicatively, and/or operatively) for inter-component communications. In some examples, communication channels 38 may include a system bus, a network connection, an inter-process communication data structure, or any other method for communicating data.

One or more processors 40 may implement functionality and/or execute instructions within computing device 2. For example, processors 40 may process instructions stored in storage device 50 that execute the functionality of text entry module 6.

One or more storage devices 50 within computing device 2 may store information required for use during operation of computing device 2. Storage device 50, in some examples, has the primary purpose of being a short term and not a long term computer-readable storage medium. Storage device 50 on computing device 2 may be a volatile memory and therefore not retain stored contents if powered off. Examples of volatile memories include random access memories (RAM), dynamic random access memories (DRAM), static random access memories (SRAM), and other forms of volatile memories known in the art. Storage device 50 may further be configured for long-term storage of information as non-volatile memory space and retain information after power on/off cycles. Examples of non-volatile memory configurations include magnetic hard discs, optical discs, floppy discs, flash memories, or forms of electrically programmable memories (EPROM) or electrically erasable and programmable (EEPROM) memories. In some examples, processors 40 on computing device 2 read and execute instructions stored by storage device 50. In addition, text entry module 6, auto-correction module 8, and URL detection module 10 running on computing device 2 may store information within storage device 50 during program execution.

Computing device 2 may contain one or more input devices 20 that computing device 2 uses to receive input from a user, such as user 3 from FIG. 1, via tactile, audio, or video feedback. Input devices 20 of computing device 2, in one example, includes a presence-sensitive screen, a touch-sensitive screen, a mouse, a keyboard, a voice responsive system, video camera, microphone or any other type of device for detecting a command from a human or machine. Input devices 20 may include UI device 4 of FIG. 1.

Computing device 2 may contain one or more output devices 22 that computing device 2 uses to provide output to a user, such as the user from FIG. 1, via tactile, audio, or video stimuli. Output device 22 of computing device 2, in one example, includes a presence-sensitive screen, a sound card, a video graphics adapter card, or any other type of device for converting a signal into an appropriate form understandable by human or machine. Additional examples of output device 22 include a speaker, a cathode ray tube (CRT) monitor, a liquid crystal display (LCD), or any other type of device that can generate intelligible output to a user. Output devices 22 may include UI device 4 of FIG. 1. In some examples, such as when UI device 4 of FIG. 1 includes a component with both input and output functions, such as a presence-sensitive screen, the presence-sensitive screen or other component may embody both an output device 22 and an input device 20.

Storage device 50 may store program instructions and/or data associated with text entry module 6, auto-correction module 8, and URL detection module 10. For example, text entry module 6 may include instructions that cause processors 40 of computing device 2 to perform one or more of the operations and actions described in the present disclosure.

In accordance with the techniques of this disclosure, computing device 2 may receive a string of text at input device 20 (e.g., computing device 2 may receive the string of text from user 3 at UI device 4 of FIG. 1). Input device 20 may transmit the user input to auto-correction module 8 of text entry module 6 and/or URL detection module 10 of computing device 2 over communication channel 48.

Upon receiving the string of text from input device 20, auto-correction module 8 may scan the string of text to determine if the string of text includes any spelling errors. For instance auto-correction module 8 may scan the string of text to determine whether the string of text includes at least two words joined without space characters. In some examples, auto-correction module 8 may compare the string of text with a dictionary in at least one language to detect whether the string of text includes at least two words joined without space characters. In response to detecting that the string of text includes at least two words joined without space characters, auto-correction module 8 may correct the string of text by inserting one or more space characters between each of the at least two words. In some cases, auto-correction module 8 may send the corrected string of text to output device 22. In some examples, auto-correction module 8 may transmit the corrected user input to URL detection module 10 over communication channel 48.

Upon receiving the string of text from input device 20, URL detection module 10 may scan the string of text to determine if the string of text includes a URL. For example, URL detection module 10 may determine that the string of text includes a URL where the string of text includes a period character followed by a domain suffix.

In response to determining that the string of text includes a URL, URL detection module 10 may remove the one or more space characters inserted into the string of text by auto-correction module 8 to form a valid URL. A valid URL may include a domain name, a period or "full-stop" character, and a domain suffix. In some examples, the domain suffix may include one or more period or "full-stop" characters, such as in some domain suffixes that may include both a country code TLD and a nationally defined top-level domain preceding the country code TLD, such as in the example of ".co.uk". In examples such as this, the domain suffix follows a first period character, and the domain suffix includes a second period character, e.g., the period in between the nationally defined top-level domain "co" and the country code TLD "uk". In some examples, URL detection module 10 scans both the string of text and the corrected string of text to determine whether either contains a URL. In some cases, URL detection module 10 may send the valid URL to output device 22.

In some examples, the dictionary used to determine whether the string of text includes at least two words joined without space characters is a custom dictionary specific to at least one of computing device 2 or a user account associated with computing device 2. By using a custom dictionary, auto-correction module 8 may avoid repeating unwanted auto-corrections. For example, URL detection module 10 may insert an entry into the custom dictionary where it determines that auto-correction module 8 incorrectly inserted one or more space characters into a URL. For instance, after removing the space character from "coconutmirror", URL detection module 10 may insert the word "coconutmirror" into the custom dictionary. Therefore, the next time auto-correction module 8 received the string of text "coconutmirror" it may recognize the word and not incorrectly insert one or more space characters.

In some examples, each of the components of computing device 2 may be capable of operation in a variety of alphabets or other writing systems (i.e., scripts). In some cases, computing device 2 may be capable of operation in any language that may be represented in Unicode. For example, text entry module 6 may be capable of receiving text including characters of the Latin, Greek, Arabic, Cyrillic, Hebrew, Japanese, Devanagari, Urdu, Korean, Malay, That, Tamil, Telugu, and/or Chinese scripts, all of which writing systems are referred to as "scripts" for purposes of this disclosure.

Figure 3A:
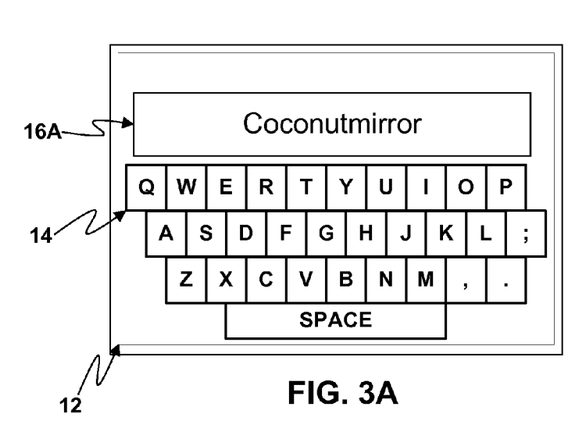
FIGS. 3A-3D are conceptual diagrams illustrating an example of a computing device performing operations to undo auto-corrections made to a uniform resource locator, in accordance with one or more techniques of the present disclosure.

FIGS. 3A-3D are conceptual diagrams illustrating an example of a computing device performing operations to undo auto-corrections made to a uniform resource locator, in accordance with one or more techniques of the present disclosure. Referring specifically to the example of FIG. 3A, GUI 12 is shown as including graphical keyboard 14 and text entry field 16A. As discussed previously, GUI 12 may be displayed by UI device 4 of computing device 2. In the example of FIG. 3A, a string of text (i.e., "Coconutmirror") has been entered into graphical keyboard 14 and is displayed in text entry field 16A.

Figure 3B:
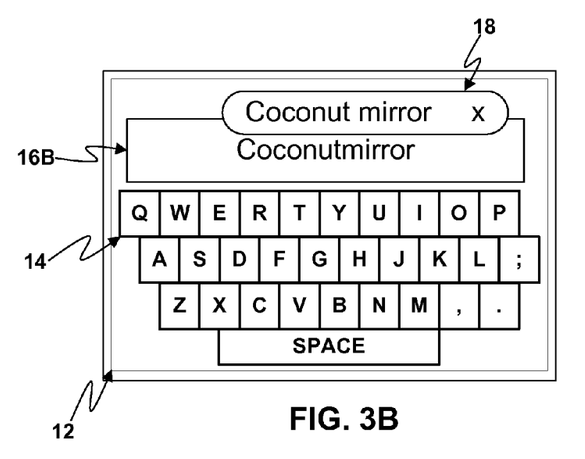

In response to receiving the string of text, computing device 2 determines that the string of text includes an error and causes suggestion window 18 to be included with graphical keyboard 14 and text entry field 16B in GUI 12. Suggestion window 18 is illustrated as displaying a corrected string of text (i.e., Coconut mirror). As described previously, the corrected string of text may be determined by auto-correction module 8 of text entry module 6 of computing device 2.

Figure 3C:
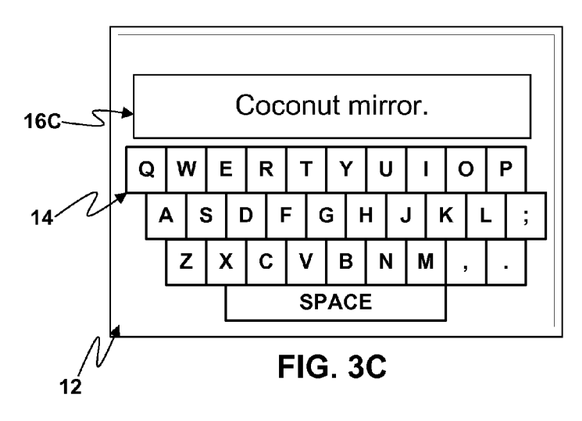

In the example of FIG. 3C, in response to receiving a subsequent input of a period character, computing device 2 applies the corrections to the string of text and causes text entry field 16C to display the corrected string of text along with the period character (i.e., "Coconut mirror.").

Figure 3D:
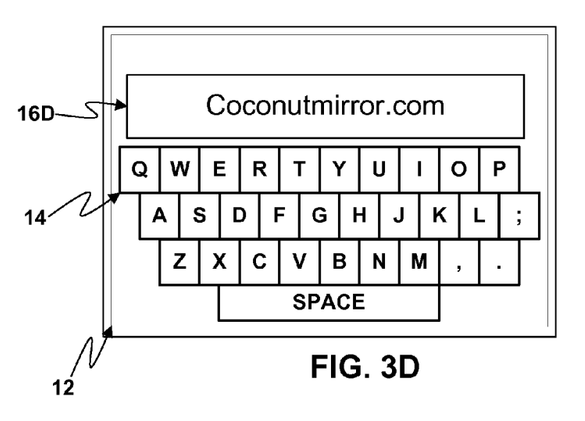

As shown in the example of FIG. 3D, in response to receiving subsequent input of a domain suffix (i.e., "com") computing device 2 removes the automatically inserted space character to form a valid URL (i.e., "Coconutmirror.com").

In some examples, computing device 2 may, in addition to removing one or more automatically inserted space characters, insert additional characters at the start of the URL (e.g., "www." and/or "http://").

Figure 4:
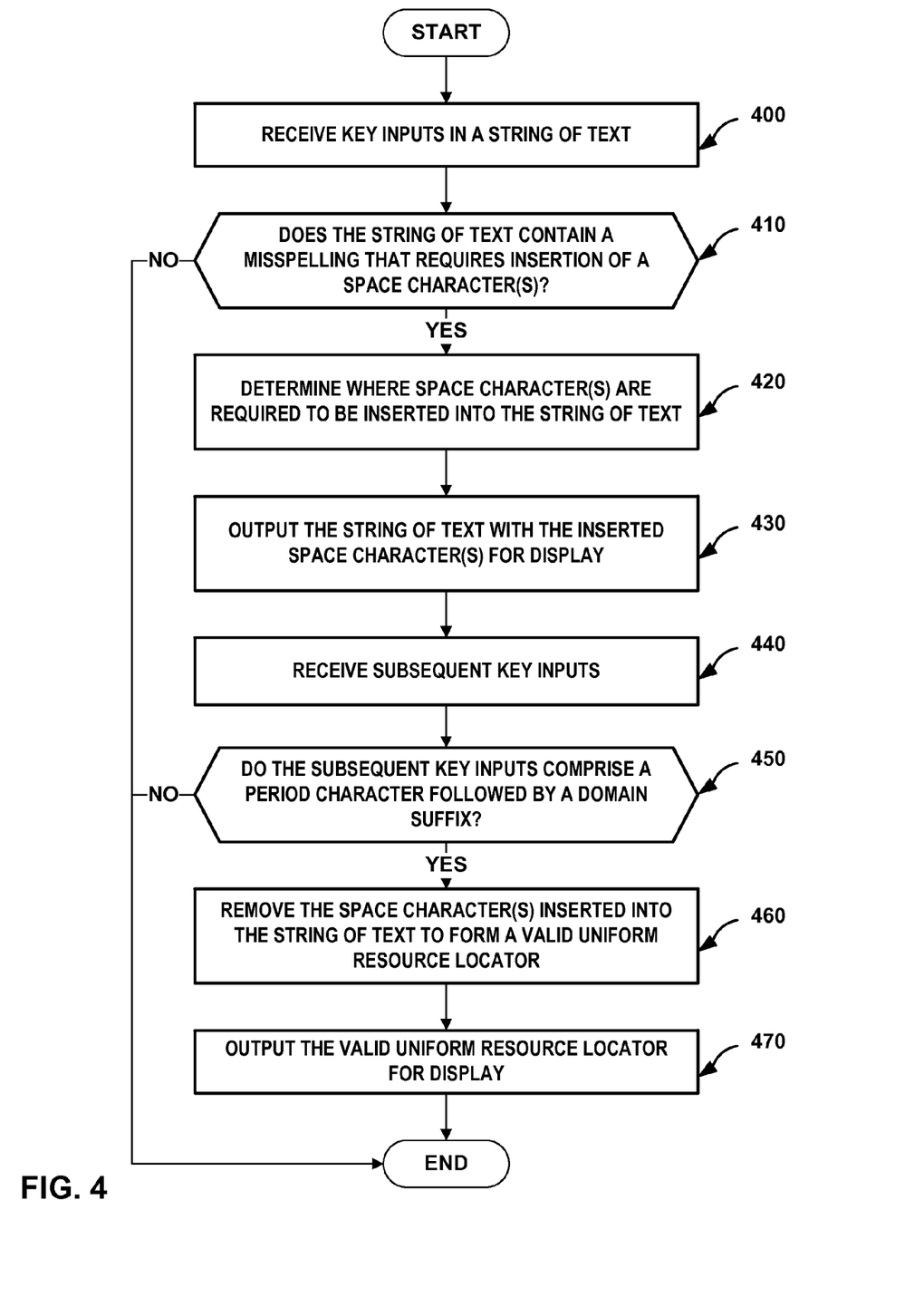
FIG. 4 is a flow diagram illustrating example operations of a computing device to undo auto-corrections made to uniform resource locators, in accordance with one or more techniques of the present disclosure.

FIG. 4 is a flow diagram illustrating an example operation of a computing device. The method of FIG. 4 may be performed by one or more processors of a computing device, such as the computing device illustrated in FIG. 2. For purposes of illustration, FIG. 4 is described below within the context of computing device 2 of FIGS. 1 and 2.

Computing device 2 may receive key inputs in a string of text (400). For example, computing device 2 may receive a string of text from user 3 of FIG. 1 at UI device 4. Computing device may determine whether the string of text contains a misspelling that required insertion of a space character(s) (410). For example, auto-correction module 8 and/or text entry module 6 may compare the string of text to a dictionary.

Where computing device 2 determines that the string of text contains a misspelling that requires insertion of a space character, computing device 2 may determine where the space character(s) are required to be inserted into the string of text (420). Computing device 2 may then display the string of text with the inserted space characters(s) (430). Computing device 2 may then receive subsequent key inputs (440). For example, computing device 2 may receive subsequent key inputs from user 3 of FIG. 1 at UI device 4. Computing device 2 may then determine whether the subsequent key inputs comprise a period character followed by a domain suffix (450). Where computing device 2 determines that the subsequent key inputs comprise a period character followed by a domain suffix, computing device 2 may then remove the space character(s) inserted into the string of text to form a valid uniform resource locator (460). Computing device 2 may then output the valid uniform resource locator for display at a display device operatively coupled to the computing device (470).

In some examples, some of the steps of the method of FIG. 4 may be condensed into a single step or omitted in their entirety.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache). Various embodiments have been described. These and other embodiments are within the scope of the following claims.

The invention claimed is:

1. A method comprising:
receiving, by a computing device, key inputs indicating a string of text;
auto-correcting, by the computing device, the string of text, wherein the auto-correcting comprises comparing the string of text with a dictionary in at least one language to detect at least two words in the string of text, and inserting a space character between each of the at least two words;
outputting, by the computing device and for display at a display device operatively coupled to the computer device, the at least two words;
in response to receiving subsequent key inputs indicating a period character followed by a domain suffix, removing, by the computing device, the inserted one or more space characters from the string of text, thereby forming a valid uniform resource locator, wherein the valid uniform resource locator comprises a domain name consisting of the at least two words, the period character, and the domain suffix; and
outputting, by the computing device and for display at the display device, the valid uniform resource locator.

2. The method of claim 1, wherein the display device includes a presence-sensitive display, and wherein the key inputs are received at a virtual text entry field at the presence-sensitive display.

3. The method of claim 1, wherein the period character is a first period character, and wherein the domain suffix comprises a second period character.

4. The method of claim 1, wherein the string of text indicated by the key inputs comprises the at least two words.

5. The method of claim 1, further comprising:
outputting, for display at the display device, a text-entry field,
wherein the key inputs in the string of text are displayed in the text-entry field, and wherein the valid uniform resource locator is displayed in the text-entry field.

6. The method of claim 1, wherein the computing device is a mobile computing device.

7. The method of claim 1, further comprising detecting that the subsequent key inputs indicate a period character followed by a character string consisting of "com", "org", "edu", "net", or a two-letter country code top-level domain suffix.

8. The method of claim 1, further comprising adding the valid uniform resource locator to a custom dictionary.

9. The method of claim 8, wherein the custom dictionary is a specific to at least one of the computing device or a user account associated with the computing device.

10. The method of claim 1, wherein the key inputs indicate characters in a script selected from at least one of a Latin, Greek, Arabic, Cyrillic, Hebrew, Japanese, Devanagari, Urdu, Korean, Malay, That, Tamil, Telugu and Chinese script, and the dictionary in the at least one language comprises the at least two words in the string of text in the selected script.

11. A computing device comprising:
at least one processor;
wherein the at least one processor is configured to:
receive key inputs indicating a string of text;
auto-correct the string of text, wherein auto-correcting comprises comparing the string of text with a dictionary in at least one language to detect at least two words in the string of text, and inserting a space character between each of the at least two words;
output for display, at a display device operatively coupled to the computer device, the at least two words;
in response to receiving subsequent key inputs indicating a period character followed by a domain suffix, remove the inserted one or more space characters from the string of text, thereby forming a valid uniform resource locator, wherein the valid uniform resource locator comprises a domain name consisting of the at least two words, the period character, and the domain suffix; and output, for display at the display device, the valid uniform resource locator.

12. The computing device of claim 11, wherein the display device comprises a presence-sensitive display operatively connected to the at least one processor.

13. The computing device of claim 12, wherein the key inputs are received at the presence-sensitive display, and wherein the valid uniform resource locator is output for display at the presence-sensitive display.

14. The computing device of claim 11, wherein the device is a mobile device.

15. The computing device of claim 11, further comprising:
one or more modules operable by the at least one processor to output, at the display device, a text-entry field,
wherein the valid uniform resource locator is outputted in the text-entry field.

16. A non-transitory computer-readable storage medium comprising instructions that, when executed, cause one or more processors of a computing device to:
receive key inputs indicating a string of text;
auto-correct the string of text, wherein auto-correcting comprises comparing the string of text with a dictionary in at least one language to detect at least two words in the string of text, and inserting a space character between each of the at least two words;
output, for display at a display device operatively coupled to the computer device, the at least two words;
in response to receiving subsequent key inputs indicating a period character followed by a domain suffix, remove the inserted one or more space characters from the string of text, thereby forming a valid uniform resource locator, wherein the valid uniform resource locator comprises a domain name consisting of the at least two words, the period character, and the domain suffix; and
output, for display at the display device, the valid uniform resource locator.

17. The non-transitory computer-readable storage medium of claim 16, wherein the instructions further cause the one or more processors to:
output for display, at the display device, a text-entry field;
output for display, in the text-entry field, the key inputs in the string of text;
and output for display, in the text-entry field, the valid uniform resource locator.

* * * * *

UNITED STATES PATENT AND TRADEMARK OFFICE
CERTIFICATE OF CORRECTION

| | | |
|---|---|---|
| PATENT NO. | : 8,601,359 B1 | Page 1 of 1 |
| APPLICATION NO. | : 13/671225 | |
| DATED | : December 3, 2013 | |
| INVENTOR(S) | : Erica Baker | |

It is certified that error appears in the above-identified patent and that said Letters Patent is hereby corrected as shown below:

In the claims

Column 10, line 43: "a specific to at least one of the computing device or a user account associated with the computing device" should be changed to -- specific to at least one of the computing device or a user account associated with the computing device. --

Signed and Sealed this
Sixth Day of October, 2015

Michelle K. Lee
*Director of the United States Patent and Trademark Office*